US012566324B2

(12) United States Patent
Chen et al.

(10) Patent No.: US 12,566,324 B2
(45) Date of Patent: Mar. 3, 2026

(54) INVERTED MICROSCOPIC IMAGING SYSTEM WITH PROGRAMMABLE LED ARRAY FOR MULTI-CONTRAST LABEL-FREE IMAGING

(71) Applicant: Nanjing University of Science and Technology, Nanjing (CN)

(72) Inventors: Qian Chen, Nanjing (CN); Chao Zuo, Nanjing (CN); Jiasong Sun, Nanjing (CN); Shijie Feng, Nanjing (CN); Yuzhen Zhang, Nanjing (CN); Guohua Gu, Nanjing (CN)

(73) Assignee: NANJING UNIVERSITY OF SCIENCE AND TECHNOLOGY, Nanjing (CN)

( * ) Notice: Subject to any disclaimer, the term of this patent is extended or adjusted under 35 U.S.C. 154(b) by 378 days.

(21) Appl. No.: 18/026,276

(22) PCT Filed: Aug. 18, 2021

(86) PCT No.: PCT/CN2021/113185
§ 371 (c)(1),
(2) Date: Mar. 14, 2023

(87) PCT Pub. No.: WO2022/062773
PCT Pub. Date: Mar. 31, 2022

(65) Prior Publication Data
US 2023/0359010 A1     Nov. 9, 2023

(30) Foreign Application Priority Data
Sep. 24, 2020     (CN) .......................... 202011012762.5

(51) Int. Cl.
*G02B 21/14*         (2006.01)
*G02B 21/00*         (2006.01)

(52) U.S. Cl.
CPC .......... *G02B 21/14* (2013.01); *G02B 21/0008* (2013.01); *G02B 21/0032* (2013.01); *G02B 21/008* (2013.01)

(58) Field of Classification Search
CPC ............ G02B 21/0008; G02B 21/0032; G02B 21/008
See application file for complete search history.

(56) References Cited

U.S. PATENT DOCUMENTS

2007/0097369 A1     5/2007   Shimada
2020/0209604 A1     7/2020   Chen et al.

FOREIGN PATENT DOCUMENTS

CN          103197413   A      7/2013
CN          10-4765138  *      7/2015   ............. G02B 21/06
(Continued)

OTHER PUBLICATIONS

Beltrame et al., "Phase Recovery from Optical Phase Contrast Microscopy", Proceedings of the IEEE, Feb. 1983, vol. 71, No. 2, total 3 pages.
(Continued)

*Primary Examiner* — Lauren Nguyen
(74) *Attorney, Agent, or Firm* — Birch, Stewart, Kolasch & Birch, LLP

(57)     ABSTRACT

The invention discloses a miniaturized, low-cost, multi-contrast label-free microscopic imaging system. The imaging system is based on an inverted microscopic structure, a highly integrated optical system is designed by adopting a micro lens having a fixed focal length, and a complex optical system of a traditional microscope system is replaced, such that the whole microscope is highly integrated. The system uses a programmable LED array as an illumination light source; the LED array is controlled by a computer to display different illumination modes, six imaging functions of a bright field, a dark field a rainbow dark field, Rheinberg
(Continued)

optical dyeing, differential phase contrast, and quantitative phase imaging are achieved; and diversified unmarked imaging methods are provided for biological applications. The invention provides a matching control system, which can realize system hardware control and algorithm execution and display, comprises functions such as illumination control, camera parameter adjustment quantitative phase reconstruction recovery, two-dimensional/three-dimensional result display, and quantitative profile analysis, and can realize diversified information obtaining and analysis of unmarked samples.

9 Claims, 3 Drawing Sheets

(56) References Cited

FOREIGN PATENT DOCUMENTS

| | | | |
|---|---|---|---|
| CN | 104765138 | A | 7/2015 |
| CN | 105158887 | A | 12/2015 |
| CN | 105425377 | A | 3/2016 |
| CN | 103197413 | B | 3/2017 |
| CN | 106768396 | A | 5/2017 |
| CN | 107272178 | A | 10/2017 |
| CN | 107290846 | A | 10/2017 |
| CN | 10-8594418 | * | 9/2018 |
| CN | 108594418 | A | 9/2018 |
| CN | 109375358 | A | 2/2019 |
| CN | 109581645 | A | 4/2019 |
| CN | 107272178 | B | 6/2019 |
| CN | 107290846 | B | 6/2019 |
| CN | 111123497 | A | 5/2020 |
| CN | 109375358 | B | 7/2020 |
| CN | 112130309 | A | 12/2020 |
| WO | WO 2016/177319 | A1 | 11/2016 |
| WO | WO 2019/024491 | A1 | 2/2019 |
| WO | WO 2020/107893 | A1 | 6/2020 |

OTHER PUBLICATIONS

Ding, "Design and Development of the Built-In Cell Dynamic 3D Microscopic Imaging System of the Incubator", Basic Sciences, China Master's Theses Full-Text Database), Jun. 15, 2020, No. 6, ISSN: 1674-0246, total 71 pages.

Fan et al., "Review of the development of differential phase contrast microscopy", Infrared and Laser Engineering, Jun. 30, 2019, vol. 48, No. 6, total 21 pages.

International Search Report for PCT/CN2021/113185 (PCT/ISA/210) mailed on Nov. 17, 2021.

Kong et al., "Transmission Stereo Microscope Based on Programmable LED Array Illumination", Acta Optica Sinica, May 2016, vol. 36, No. 5, total 8 pages.

Toda et al., "Phase-contrast microscope with molecular contrast", 2019 CLEO Europe and EQEC, Jun. 2019, 1 page.

* cited by examiner

INVERTED MICROSCOPIC IMAGING SYSTEM WITH PROGRAMMABLE LED ARRAY FOR MULTI-CONTRAST LABEL-FREE IMAGING

TECHNICAL AREAS

The present invention belongs to the fields of optical microscopic imaging, quantitative phase imaging (QPI) technology, and relates in particular to a miniaturized, low-cost, multi-contrast label-free microscopic imaging system.

BACKGROUND TECHNOLOGY

Phase contrast imaging is an important optical tool for label-free microscopic imaging for biological research, drug development and materials testing. It can enhance the imaging contrast by converting sample thickness, which is invisible to the naked eye, into detectable intensity changes without any exogenous contrast agent. Phase-contrast methods, such as dark-field imaging, Rheinberg optical staining imaging and differential interference imaging, are widely used in visual imaging of transparent samples, obtaining diverse structural information of the observed sample and providing rich and powerful data for diagnosis. To enable diverse observation of samples, it is often necessary to provide multiple visualization results and quantitative data of a sample under different microscopic imaging methods for more visual display and comparison. For example, the bright-field microscopy based on Köhler illumination uses transmitted light imaging, providing lateral resolution within the theoretical bandwidth of partially coherent imaging. However, to obtain details of the sample, dark-field microscopy requires a change in the hardware configuration of the microscope, i.e., an annular aperture diaphragm is added to collect scattering or diffraction information of the sample. More sophisticated imaging methods often require more complex optical imaging systems, which limits the application of the microscope to different samples.

In recent years, programmable LED arrays and liquid crystal display (LCD) have been introduced into microscopic systems to replace traditional aperture diaphragms, enabling flexible and adjustable illumination. For example, in LED-based systems, dark-field microscopy can be achieved by adjusting illumination patterns so that the minimum illumination numerical aperture (NA) is larger than the NA of the objective lens, extracting visual high-resolution detail of the sample. In general, LEDs can be switched between different illumination modes by sending different serial port protocols through the computer. As a result, a variety of microscopic imaging methods such as transport of intensity equation (TIE), differential phase contrast (DPC), and Fourier psychographic microscopy (FPM) can be implemented. These methods further obtain three-dimensional (3D) quantitative information of transparent samples through deconvolution or iterative reconstruction algorithms, providing more effective and reliable quantitative data for biological research, cell analysis, disease diagnosis, etc. In addition, LED arrays can also enable multi-contrast imaging in a fixed system. In 2015, Joo et al. used three channels with different illumination patterns to simultaneously illuminate samples and acquire images, and obtained observations of bright-field, dark-field, and DPC by channel separation (Lee D, Ryu S, Kim U, et al. Color-coded LED microscopy for multi-contrast and quantitative phase-gradient imaging. Biomedical optics express, 2015, 6(12):

4912-4922.). Furthermore, the miniaturized multi-contrast microscopes based on LED illumination and smartphone have been proposed (Jung D, Choi J H, Kim S, et al. Smartphone-based multi-contrast microscope using color-multiplexed illumination. Scientific reports, 2017, 7(1): 1-10.). However, such a system requires a smartphone as the image acquisition device and therefore does not guarantee the stability of the system and cannot be applied to live cell imaging. Currently, multi-contrast microscope systems that can achieve stable imaging effects have not been investigated.

CONTENTS OF THE INVENTION

The purpose of the present invention is to provide a miniaturized, low-cost, multi-contrast label-free microscopic imaging system for the above-mentioned problems of the prior art.

A technical solution to achieve the purpose of the invention: a miniaturized, low-cost, multi-contrast, label-free microscopic imaging system. The system includes an imaging unit which is an inverted microscopic optical path comprising a programmable LED array illumination source, a tube lens, a miniaturized lens, a sample carrier, a color camera, and a 3D displacement stage, set in sequence from top to bottom. The miniaturized lens is used as an objective lens.

It also includes a control unit for controlling the illumination pattern of the programmable LED array light source, adjusting the parameters of the color camera, controlling the image acquisition by the camera, switching the imaging modes, switching the display of 2D/3D imaging results, and performing analysis of the imaging results.

Furthermore, the programmable LED array can produce illumination patterns corresponding to six imaging modes, including bright field imaging, dark field imaging, rainbow dark-field imaging, Rheinberg optical staining imaging, DPC imaging, and QPI.

Compared with the prior art, the main advantages of the present invention are reflected in the following aspects. (1) The invention adopts an inverted microscope structure with LED arrays as the illumination light source, and for the first time achieves six microscopic imaging modes in a fixed system configuration, including bright field, dark field, rainbow dark field, DPC, Rheinberg optical staining, and QPI, which enables diverse multi-contrast observation. (2) This system uses a miniaturized lens instead of the traditional microscope objective lens to design a highly integrated microscope optical path, integrating the entire microscope system in the size of $14*16.5*20$ cm$^3$. Thus, the microscope can be placed inside the incubator for observation, ensuring a high degree of integration while ensuring imaging stability. (3) It is equipped with a control unit to achieve good interaction with the whole microscope, which can easily complete mode switching, parameter adjustment, phase reconstruction, 2D/3D display and quantitative numerical analysis through software control, without any mechanical movement. (4) The entire system uses low-cost hardware to obtain high-quality, diverse observations and enable quantitative phase measurements.

The invention is described in further detail below in conjunction with the accompanying drawings.

ILLUSTRATIONS

Figure 4:
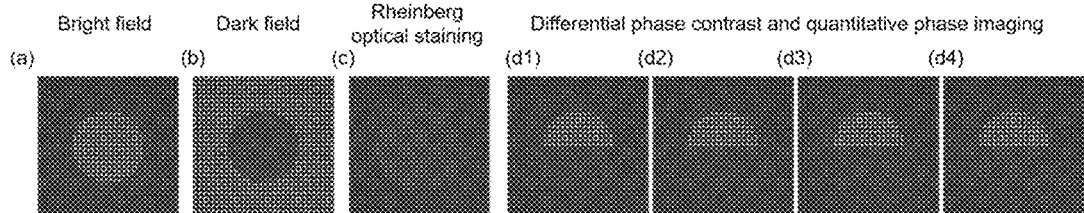

FIG. 4 shows a schematic illustration of the illumination pattern of a miniaturized, low-cost, multi-contrast label-free microscopic imaging system in one of the embodiments. The illumination pattern of bright field is shown in FIG. 4(a). The illumination patterns of dark-field and rainbow dark-field are shown in FIG. 4(b). The illumination pattern of Rheinberg optical staining imaging is shown in FIG. 4(c). The illumination patterns for DPC and QPI are shown in FIG. 4(d1)-FIG. 4(d4 ) for the four directions of top, bottom, left and right.

Figure 5:
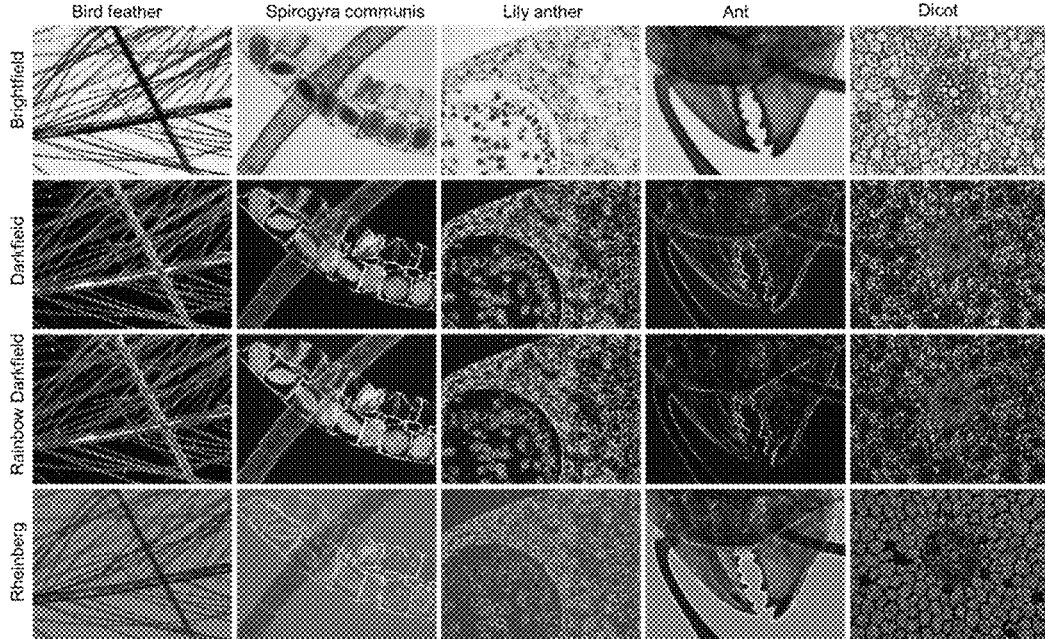

FIG. 5 shows the observation results of multiple samples under bright field, dark field, rainbow dark field, and Rheinberg optical staining in one of the embodiments. FIGS. 5(a1)-5(a5) show the observation results of bird feather, Spirogyra communis, lily anther, ant, and dicots under bright field. FIGS. 5(b1)-5(b5) show the observation results of bird feather, Spirogyra communis, lily anther, ant, and dicots under dark field. FIGS. 5(c1)-5(c5) show the results of bird feather, Spirogyra communis, lily anther, ant, and dicots under rainbow dark field. FIG. 5(d1)-5(d5) show the results of bird feather, Spirogyra communis, lily anther, ant, and dicots under Rheinberg optical staining, respectively.

Figure 6:
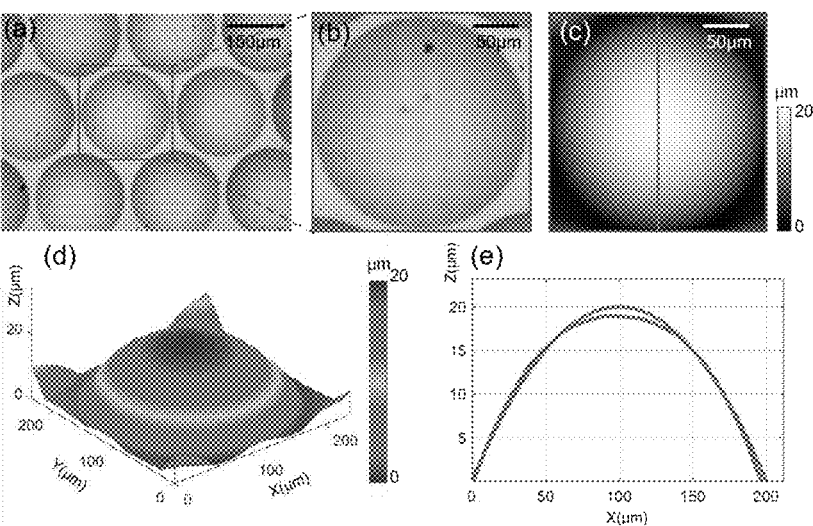

FIG. 6 shows the quantitative phase results and the analysis results of the microlens array in one of the embodiments. FIG. 6(a) shows the image of the microlens array in the bright field. FIG. 6(b) shows a microlens unit of interest in FIG. 6(a). FIG. 6(c) shows the quantitative phase result corresponding to the microlens unit in FIG. 6(b). FIG. 6(d) shows a color rendering of the quantitative phase in FIG. 6(c), and FIG. 6(e) shows a comparison of the quantified profile of FIG. 6(c) and the standard value of the phase.

Figure 7:
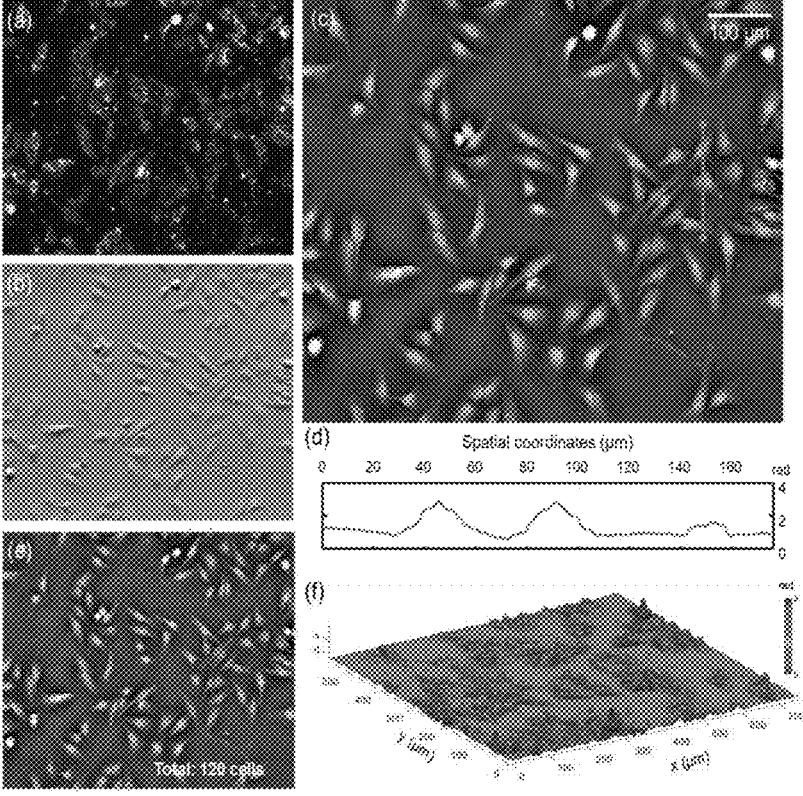

FIG. 7 shows the quantitative phase reconstruction result and analysis results of Hela cells in one of the embodiments. FIG. 7(a) shows the dark-field imaging result of Hela cells. FIG. 7(b) shows the phase gradient results of Hela cells under DPC imaging. FIG. 7(c) shows the quantitative phase result of FIG. 7(b). FIG. 7(d) shows the quantitative profile of the phase in FIG. 7(c). FIG. 7(e) shows the cell counting result obtained with the cell counting function, and FIG. 7(f) shows the 3D color rendering of the quantitative phase in FIG. 7(c).

SPECIFIC IMPLEMENTATION

In order to more clearly illustrate the purpose, technical solutions and advantages, the present application is described in further detail below in conjunction with the accompanying drawings and examples. It should be understood that the specific embodiments described herein are intended to explain the present application only and are not intended to limit it.

It should be noted that if there is a directional indication (such as up, down, left, right, forward, back . . . ) involved in an embodiment of the present invention, the directional indication is used only to explain the relative position relationship, movement, etc. between the parts in a particular posture (as shown in the attached figure). If the particular posture is changed, the directional indication is changed accordingly.

Figures 1, 2:
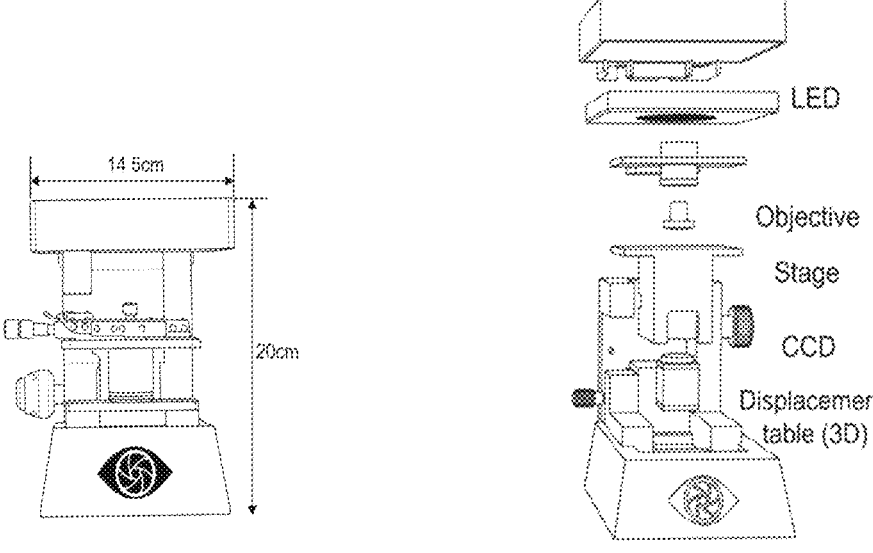
FIG. 1 shows an overall schematic diagram of a miniaturized, low-cost, multi-contrast, label-free microscopic imaging system in one of the embodiments.
FIG. 2 shows a main view of an exploded view of a miniaturized, low-cost, multi-contrast, label-free microscopic imaging system in one of the embodiments.
Figure 3:
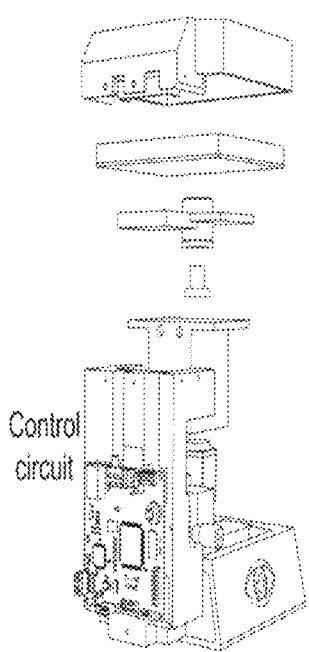
FIG. 3 shows a rear view of an exploded view of a miniaturized, low-cost, multi-contrast, label-free microscopic imaging system in one of the embodiments.

In one of the embodiments, FIG. 1-FIG. 3 present a miniaturized, low-cost, multi-contrast, label-free microscopic imaging system. It includes an imaging unit, which is an inverted microscopic optical path comprising a programmable LED array illumination source, a tube lens, a miniaturized lens, a sample carrier, a color camera, and a 3D displacement stage, set in sequence from top to bottom.

It also includes a control unit (a QT-based operating software) for controlling the illumination pattern of the programmable LED array light source, adjusting the parameters of the color camera, controlling the image acquisition by the camera, switching the imaging modes, switching the display of 2D/3D imaging results, and performing analysis of the imaging results.

The whole system is highly integrated and the size is only $14*16.5*20$ cm$^3$. The LED array is used as the illumination system, which is directly controlled by a computer to display the color illumination patterns. The emitted light is transmitted through the sample and then collected by the miniaturized lens and recorded by the color camera to obtain the acquired image, enabling multi-contrast observation and analysis.

Here, the programmable LED array consists of a number of LED units arranged in a regular two-dimensional matrix, each of which can achieve R, G, B three channels of illumination. The typical illumination wavelengths are 632 nm for red light, 522 nm for green light and 470 nm for blue light. The center distance d between each point LED light source is 2 mm, and the distance h between the programmable LED array and the upper surface of the sample carrier is 30 mm~90 mm.

Furthermore, in one of the embodiments, the miniaturized lens has a magnification of 6.4×, a NA of 0.14, a focal length of 4.25, and an aberration of 1% or less.

The use of miniaturized lens allows the entire system to be highly integrated while ensuring imaging stability.

Further, in one of the embodiments, from FIG. 4, the programmable LED array can produce six imaging modes of illumination by varying the illumination pattern, including: bright-field imaging, dark-field imaging, rainbow dark-field imaging, Rheinberg optical staining imaging, DPC imaging, and QPI.

The illumination patterns for the six imaging modes described are matched to the NA of the miniaturized lens. Assuming the NA of the miniaturized lens is NA$_{obj}$, an illumination NA$_{ill}$ corresponding to each LED is:

$$NA_{ill} = \sin\left[\arctan\left(\frac{R_{LED}}{h}\right)\right]$$

where R$_{LED}$ represents the distance from each LED to the LED corresponding to the centre of the optical axis and h is the distance from the programmable LED array to the upper surface of the sample carrier.

Bright-field imaging: the illumination pattern is a circle and the illumination NA of all illuminated LEDs is less than or equal to the NA of the miniaturized lens, in which case it is transmitted-light imaging.

Dark field imaging: the illumination pattern is a circular hollow pattern, and the NA of the illumination of all illuminated LEDs is larger than the NA of the miniaturized lens. The LEDs in the circular part are not illuminated, and the other LEDs are illuminated. In this case, the sample is illuminated with a large angle light, presenting high-resolution detailed information of the sample.

Rainbow dark-field imaging: the illumination pattern is the same as that for dark-field imaging, i.e., the illumination NA of all illuminated LEDs is larger than the NA of the miniaturized lens. The color of the illumination light is rainbow distribution.

Rheinberg optical staining imaging: the illumination pattern is a circle, where LEDs with an illumination NA less than or equal to the NA of the miniaturized lens are of any color, and LEDs with an illumination NA greater than the NA of the miniaturized lens are aliquoted by different colors. The LED corresponding to the bright field and the LED corresponding to the dark field display different colors of illumination light, so that the sample and the background appear in different colors.

DPC imaging: the illumination pattern is a half circle, and the NA of all illuminated LEDs is less than or equal to the NA of the miniaturized lens.

QPI: the illumination pattern is a half circle, and the NA of all illuminated LEDs is less than or equal to the NA of the miniaturized lens.

Further, in one of the embodiments, DPC imaging is implemented by a differential algorithm to obtain a phase gradient image of the sample in any direction (0~360°). The formula for the DPC imaging algorithm is expressed as:

$$I_{lr} = \frac{I_l - I_r}{I_l + I_r}$$

where $I_{lr}$ represents the phase gradient of DPC imaging in any axis direction, and $I_l$ and $I_r$ represent two images acquired with asymmetric illumination in a axis direction.

Further, in one of the embodiments, QPI is achieved by a DPC quantitative phase recovery algorithm, and the specific process of which includes:

Step 1, four illumination patterns are used to irradiate the sample along two asymmetric axes (such tilted illumination introduces a phase factor to convert the invisible sample phase to a measurable intensity) to acquire the corresponding images. For the sake of illustration, it is assumed that the sample images acquired along a axis are $I_l$ and $I_r$, and the sample images acquired in the other axis are $I_u$ and $I_d$, respectively. The images are acquired in the order of $I_l$, $I_r$, $I_u$ and $I_d$.

Step 2: Calculate the phase gradient images of the sample in the two axes $I_{lr}$ and $I_{ud}$, respectively, $$I_{lr} = \frac{I_l - I_r}{I_l + I_r}$$

$$I_{ud} = \frac{I_u - I_d}{I_u + I_d}$$

Step 3: based on the imaging model, the phase transfer function for DPC imaging is calculated as:

$$PTF_{lr}(u) = \frac{\iint S_{lr}(u_j)[P^*(u_j)P(u+u_j) - P(u_j)P^*(u-u_j)]d^2u_j}{\iint S_{lr}(u_j)|P(u_j)|^2 d^2u_j}$$

where $PTF_{lr}(u)$ is the phase transfer function in the direction of the axes of $I_l$ and $I_r$, and u is the frequency coordinates of the spectrum, which can be expressed as $u=(u_x, u_y)$ ($u_x$ and $u_y$ are the spatial frequency coordinates). $S_{lr}(u_j)$ is the intensity of the illumination source in the direction of the axes of $I_l$ and $I_r$, where $u_j$ is the spatial frequency corresponding to the $j_{th}$ LED. P(u) is the pupil function, which is determined by the NA of the objective lens $NA_{obj}$ and the illumination wavelength λ. It is expressed as a circular filter function with a cut-off frequency of $$\frac{NA_{obj}}{\lambda}.$$

P* is the conjugate of P, and $d^2$ ( ⌐ ) indicates the quadratic differential symbol.

Here, the phase transfer function is generated and saved locally, and it will be called automatically at system startup. Such an approach simplifies the calculation steps and greatly improves the speed of phase reconstruction.

Step 4, Solve for the sample phase: the spectrum of the phase gradient image and phase transfer function are deconvoluted using the Tikhonov regularization to obtain quantitative phase results of the sample:

$$\phi(r) = F^{-1}\left\{ \frac{\sum_i [PTF_i^*(u)F[I_i(u)]]}{\sum_i |PTF_i(u)|^2 + \beta} \right\}$$

where $\phi(r)$ is the quantitative phase of the sample, F and $F^{-1}$ represent the Fourier transform and inverse Fourier transform. i represents an asymmetric illumination axis. $PTF_i(u)$ and $PTF_i^*(u)$ represent the phase transfer function and its conjugate in the axis direction of i. $I_i(u)$ represents the phase gradient image in the axis direction of i. β is the regularization parameter to suppress the error, and it can be taken as 0.01.

Step 5, The process is repeated until QPI is stopped.

Further, in one of the embodiments, DPC quantitative phase recovery algorithm comprises the steps located after Step 4.

$I_l$, or $I_r$, or $I_u$, or $I_d$ (that is, if the last acquisition is $I_d$, the current acquisition is $I_l$, if the last acquisition is $I_l$, the current acquisition is $I_r$, if the last acquisition is $I_r$, the current acquisition is $I_u$, and if the last acquisition is $I_u$, the current acquisition is $I_d$) is captured in a cyclic order of $I_l$, $I_r$, $I_u$, $I_d$. Each captured image is used to perform Step 2 (that is, the sample phase gradient image is obtained from the current acquisition $I_l$ and the previous acquisition $I_r$, $I_u$, $I_d$, the sample phase gradient image is obtained from the current acquisition $I_r$ and the previous acquisition $I_l$, $I_u$, $I_d$, the sample phase gradient image is obtained from the current acquisition $I_u$ and the previous acquisition $I_l$, $I_r$, $I_d$, the sample phase gradient image is obtained from the current acquisition $I_d$ and the previous acquisition $I_l$, $I_r$, $I_u$).

Here, conventional DPC imaging requires four images for phase reconstruction. In order to increase the imaging speed, the invention provides a fast imaging mode, i.e., each acquisition is calculated with the first three acquisitions. Since acquisitions typically occur in a very short period of time, the four adjacent images are usually relatively stationary. This corresponds to only a single image is acquired to complete a reconstruction, achieving the imaging speed with the highest camera frame rate.

Further, in one of the embodiments, DPC quantitative phase recovery algorithm comprises the steps located after Step 5.

Enhance the display contrast of the quantitative phase of the sample with the following process:

Histogram filtering: calculating a histogram of the gray-scale distribution of the pixel values in the reconstructed phase, and removing the background phase by selecting the range of phase values to be displayed from the histogram.

Alternatively, multi-color pseudo-color display: selecting any phase color spectrum among multiple pseudo-color distributions (Gray, Jet, Cool, Hot, Hsv, etc.) to display different structural information of the sample.

Further, in one of the embodiments, the imaging unit interacts with the control unit via an FPGA. The control unit transmits control information to the FPGA, which controls the illumination pattern of the programmable LED array and the image acquisition of the camera.

Here, it is not limited to the use of FPGAs, but can also use microcontrollers, ARMs or programmable logic devices, etc.

As a specific example, the miniaturized, low-cost, multi-contrast label-free microscopic imaging system of the present invention is illustrated in one of the embodiments for verification. In order to demonstrate the imaging results of the system of the present invention, the imaging results of bright-field, dark-field, rainbow dark-field, and Rheinberg optical staining imaging are presented using bird feather, *Spirogyra communis*, lily anther, ant, and dicots as observation targets. FIG. 5 shows the results. FIG. 5(*a*1)-FIG. 5(*a*5) are the observation results of these five samples under the bright field, which demonstrates the structural information of these samples. FIG. 5(*b*1)-FIG. 5(*b*5) are imaging results under the dark field, which provides more detailed information of the samples due to the scattered light imaging. FIG. 5(*c*1)-FIG. 5(*c*5) show the imaging results under rainbow dark field. As the sample is irradiated with different colors in different frequency directions, different structures in the sample are revealed by different colors. FIG. 5(*d*1)-FIG. 5(*d*5) show the results under the Rheinberg optical staining imaging, where it can be seen that the background of the sample is more clearly distinguished from the information in the sample.

Then, a microlens array was used as a sample to verify the QPI performance of the system and the results are shown in FIG. 6. FIG. 6(*a*) shows the visualized image of the microlens array under the bright field. At this time, the contrast of the bright field result is low due to its transparent distribution, and its thickness information is not available. One of the microlens units shown in FIG. 6(*b*) was selected for quantitative phase analysis, and the quantitative phase result is shown in FIG. 6(*c*). It can be seen that its quantitative phase distribution is clearly recovered. FIG. 6(*d*) shows the color rendering results of the quantitative phase of this microlens unit, from which its 3D structural distribution can be clearly observed. The quantitative phase values on the line in FIG. 6(*c*) are further extracted to plot the curves to quantitatively compare the errors of the reconstructed phase values with the standard phase values. As shown in FIG. 6(*e*), the system obtains a detection result that is consistent with the standard phase values.

Finally, Hela cells were used as samples to validate the QPI performance of the system on biological cells, and the imaging results are shown in FIG. 7. The dark-field imaging results of Hela cells are shown in FIG. 7(*a*), which shows the high-resolution detail information of the cells. FIG. 7(*b*) shows the phase gradient results of Hela cells under DPC imaging. QPI was performed on this sample and the results shown in FIG. 7(*c*) were obtained.

The quantitative phase values on the profile in FIG. 7(*c*) were further extracted to analyze the 3D distribution of Hela cells, and the quantitative curve shown in FIG. 7(*d*) was obtained. The system can further perform the cell counting function, as shown in FIG. 7(*e*), with 120 Hela cells contained in the entire field of view. In addition, the quantitative phase results can be displayed as a 3D rendering to enhance the display contrast, which can be observed shown in FIG. 7(*f*).

The above display describes the basic principles, main features and advantages of the present invention. It should be understood by those skilled in the art that the present invention is not limited by the embodiments described above. The above embodiments and the description in the specification only illustrate the principles of the present invention, and there will be various variations and improvements to the present invention without departing from the spirit and scope of the present invention, all of which fall within the scope of the present invention for which protection is claimed. The scope of protection claimed for the present invention is defined by the appended claims and their equivalents.

The invention claimed is:

1. A miniaturized, low-cost, multi-contrast label-free microscopic imaging system comprising:

an integrated imaging unit comprising an inverted transmission microscopic optical path including a programmable LED array illumination source configured for direct spatial coherence and wavelength modulation, a tube lens, a miniaturized lens, a sample carrier, an area-scan color camera, and a 3D displacement stage, wherein the programmable LED array illumination source, the tube lens, the miniaturized lens, the sample carrier, the area-scan color camera and the 3D displacement stage are arranged in sequence from top to bottom; and a control unit to control an illumination pattern of the programmable LED array illumination source, adjust parameters of the area-scan color camera, control an image acquisition by the area-scan color camera, switch imaging modes, switch a display of 2D/3D imaging results, and perform an analysis of the imaging results.

2. The miniaturized, low-cost, multi-contrast label-free microscopic imaging system according to claim 1, wherein the miniaturized lens has a magnification of 6.4×, a numerical aperture (NA) of 0.14, a focal length of 4.25, and a lens aberration of less than 1%.

3. The miniaturized, low-cost, multi-contrast label-free microscopic imaging system according to claim 2, wherein the programmable LED array illumination source is configured to produce illumination patterns corresponding to six imaging modes, including: bright-field imaging, dark-field imaging, rainbow dark-field imaging, Rheinberg optical staining imaging, differential phase contrast (DPC) imaging, and quantitative phase imaging (QPI), wherein the illumination patterns of the six imaging modes match the NA of the miniaturized lens, and assuming the NA of a miniaturized lens of $NA_{obj}$, the corresponding illumination $NA_{ill}$ for each LED is:

$$NA_{ill} = \sin\left[\arctan\left(\frac{R_{LED}}{h}\right)\right]$$

where $R_{LED}$ denotes a distance from each LED to the LED corresponding to a center of the optical axis and h denotes a distance from the programmable LED array illumination source to an upper surface of the sample carrier wherein the illumination patterns are defined by:

a bright-field illumination pattern comprising a circular illuminated region with an illumination NA less than or equal to the NA of the miniaturized lens;

a dark-field illumination pattern comprising a circular hollow illuminated region with an illumination NA greater than the NA of the miniaturized lens;

a rainbow dark-field illumination pattern comprising the circular hollow illuminated region of the dark-field imaging with rainbow color distribution;

a Rheinberg optical staining illumination pattern comprising a circular illuminated region with LEDs having an illumination NA less than or equal to the NA of the miniaturized lens providing a first color, and LEDs having an illumination NA greater than the NA of the miniaturized lens providing different colors;

a DPC illumination pattern comprising a half-circular illuminated region with an illumination NA less than or equal to the NA of the miniaturized lens; and a QPI illumination pattern comprising a half-circular illuminated region with an illumination NA less than or equal to the NA of the miniaturized lens.

4. The miniaturized, low-cost, multi-contrast label-free microscopic imaging system according to claim 3, wherein the control unit is further configured to perform differential phase contrast (DPC) imaging by applying a differential algorithm to obtain a phase gradient image of the sample in any direction (0~360°), and wherein a formula for the differential algorithm is expressed as:

$$I_{lr} = \frac{I_l - I_r}{I_l + I_r}$$

where $I_{lr}$ represents a phase gradient of DPC in any axis direction, and $I_l$ and $I_r$ represent two images acquired with asymmetric illumination in the said axis direction.

5. The miniaturized, low-cost, multi-contrast label-free microscopic imaging system according to claim 4, wherein the control unit is further configured to perform quantitative phase imaging (QPI) by a DPC quantitative phase recovery algorithm, comprising the sub-steps of:

acquiring corresponding images from four illumination patterns irradiating a sample along two asymmetric axes;

calculating phase gradient images of the sample in the two axes based on the acquired images;

calculating a phase transfer function for DPC imaging;

solving for a sample phase by deconvoluting a spectrum of the phase gradient images and the phase transfer function using Tikhonov regularization to obtain quantitative phase results of the sample; and repeating the process for QPI.

6. The miniaturized, low-cost, multi-contrast label-free microscopic imaging system according to claim 5, wherein the DPC quantitative phase recovery algorithm further comprises, after the sub-step of solving for the sample phase, the sub-step of:

capturing a first, second, third, and fourth image in a cyclic order, wherein each captured image is used to perform the sub-step of calculating the phase transfer function to obtain sample phase gradient image from a current acquisition and a previous acquisition within the cyclic order, thereby achieving quantitative phase imaging output at a highest camera frame rate.

7. The miniaturized, low-cost, multi-contrast label-free microscopic imaging system according to claim 6, wherein after the sub-step of repeating, the control unit is further configured to enhance display contrast of the quantitative phase of the sample by at least one of:

histogram filtering, by calculating a histogram of gray-scale distribution of pixel values in a reconstructed phase and removing background phase by selecting a range of phase values for display from the histogram; or multi-color pseudo-color display, by selecting a phase color spectrum from a plurality of pseudo-color distributions to display different structural information of the sample.

8. The miniaturized, low-cost, multi-contrast label-free microscopic imaging system according to claim 5, the control unit is further configured to generate and store a phase transfer function locally, and to automatically retrieve the stored phase transfer function at system startup.

9. The miniaturized, low-cost, multi-contrast label-free microscopic imaging system according to claim 1, wherein the imaging unit is configured to interact with the control unit via an FPGA, and wherein the control unit is configured to transmit control information to the FPGA to control the illumination pattern of the programmable LED array illumination source and the image acquisition of the area-scan color camera.

* * * * *